(12) United States Patent
Varanasi et al.

(10) Patent No.: US 7,887,921 B2
(45) Date of Patent: Feb. 15, 2011

(54) ANTI-REFLECTIVE, THERMALLY INSULATED GLAZING ARTICLES

(75) Inventors: Srikanth Varanasi, Toledo, OH (US); David A. Strickler, Toledo, OH (US)

(73) Assignee: Pilkington North America, Inc., Toledo, OH (US)

(*) Notice: Subject to any disclaimer, the term of this patent is extended or adjusted under 35 U.S.C. 154(b) by 734 days.

(21) Appl. No.: 11/359,259

(22) Filed: Feb. 22, 2006

(65) Prior Publication Data

US 2006/0188730 A1 Aug. 24, 2006

Related U.S. Application Data

(60) Provisional application No. 60/655,751, filed on Feb. 24, 2005.

(51) Int. Cl.
 *B32B 17/06* (2006.01)
 *B32B 15/04* (2006.01)

(52) U.S. Cl. .................... 428/432; 428/701; 428/702

(58) Field of Classification Search .................... 428/13, 428/34, 212, 215, 216, 336, 428, 442, 432, 428/701, 702
See application file for complete search history.

(56) References Cited

U.S. PATENT DOCUMENTS

| | | | |
|---|---|---|---|
| 4,687,687 A | | 8/1987 | Terneu et al. |
| 5,520,996 A | | 5/1996 | Balian et al. |
| 5,773,086 A | * | 6/1998 | McCurdy et al. ........ 427/255.19 |
| 5,780,149 A | | 7/1998 | McCurdy et al. |
| 6,068,914 A | | 5/2000 | Boire et al. |
| 6,165,598 A | * | 12/2000 | Nelson ........................ 428/212 |
| 6,202,976 B1 | * | 3/2001 | Johnson et al. ............. 248/476 |
| 6,218,018 B1 | | 4/2001 | McKown et al. |
| 6,265,076 B1 | * | 7/2001 | McCurdy et al. ............. 428/432 |
| 6,589,613 B1 | | 7/2003 | Kunert |
| 6,720,081 B2 | | 4/2004 | Vitt et al. |
| 2002/0150681 A1 | | 10/2002 | Boire et al. |

(Continued)

FOREIGN PATENT DOCUMENTS

EP 0 520 720 12/1992

(Continued)

OTHER PUBLICATIONS

Keller, Glass Processing Days, Published Jun. 2001 "Improved Sound Reduction With Laminated Glass".*

(Continued)

*Primary Examiner*—Jennifer C. McNeil
*Assistant Examiner*—Lauren Robinson
(74) *Attorney, Agent, or Firm*—Marshall & Melhorn LLC

(57) ABSTRACT

A laminated glass unit having at least two sheets of glass separated and bonded by a polymeric interlayer material, and further having multi-layer thin film coatings on each of the unbonded surfaces of the at least two glass sheets, is disclosed. Two or more of such laminated glass units can be utilized in various configurations to form an insulated glass unit. The thin films deposited on the unbonded glass surfaces have anti-reflective, iridescence-suppressing and solar control properties when suitable configurations, materials and layer thicknesses are chosen. The laminated glass unit and insulated glass units of the invention exhibit an excellent combination of low visible light reflectance and thermal insulating properties.

14 Claims, 2 Drawing Sheets

U.S. PATENT DOCUMENTS

2003/0215648 A1    11/2003    Varanasi et al.
2004/0163347 A1    8/2004    Hodek

FOREIGN PATENT DOCUMENTS

| | | |
|---|---|---|
| EP | 0980 850 | 2/2000 |
| GB | 1 160 294 | 8/1969 |
| GB | 2 286 008 | 8/1995 |
| WO | WO 00/37376 | 6/2000 |
| WO | WO 01/10790 | 2/2001 |
| WO | WO 01/37006 | 5/2001 |

OTHER PUBLICATIONS

Security Glazing Specification, Protective Glazing Council Published 2002.*

European Office Action of Oct. 12, 2010 for European Patent Appln. No. 06 735 788.9-2124 (counterpart application to current U.S. file).

* cited by examiner

ANTI-REFLECTIVE, THERMALLY INSULATED GLAZING ARTICLES

RELATED APPLICATION

This application is claiming the benefit, under 35 U.S.C. §119(e), of the provisional application filed Feb. 24, 2005 under 35 U.S.C. §111(b), which was granted Ser. No. 60/655,751. This provisional application is hereby incorporated by reference in its entirety.

BACKGROUND OF THE INVENTION

Thin-film coatings on glass are commonly utilized to provide specific energy attenuation and light transmittance properties. Additionally, such coatings are designed to reduce reflections from interfaces between individual coating layers and the glass when a plurality of coatings are deposited on a glass substrate. The coated articles are often utilized singularly, or in combination with other coated articles, to form a glazing.

The attributes of a coated glass substrate are dependent upon the specific coatings applied to the glass substrate. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

Anti-reflective coatings on glass are utilized to reduce the surface reflection of optical components and to reduce the reflectance of an interface between optical media with different refractive indices. The reduction of visible reflection is achieved by the principle of optical interference. When light impinges on the air-film, film-film, and film-glass interfaces, a portion of the beam is reflected at each interface. By proper choice of thin film materials and thicknesses, the individual reflected light beams can destructively interfere thereby reducing the observed visual reflectance.

While anti-reflective coatings on glass substrates are capable of reducing the observed visual reflectance, the visible light that is reflected is often an undesirable non-neutral color when viewed at a 90-degree angle incident from the glass. For purposes of this invention, a neutral color is defined under the CIELAB color scale system with an a* value in the range of about 6 to about −6 and b* value in the range of about 6 to −6.

It would be advantageous to provide a coated glass article having a low visible light reflection with the reflected light being neutral in color, and having excellent thermal insulating properties.

It would be a further advantage to have a color neutral anti-reflective coating that may be applied pyrolytically onto a glass substrate. Deposition of pyrolytic films on-line, for example, in a float glass production process allow for creation of durable, low-cost films and, in turn, versatile coated glazings.

SUMMARY OF THE INVENTION

In accordance with the present invention, there is provided a laminated glass unit comprising at least first and second sheets of glass, each of the at least first and second glass sheets having first and second major surfaces, each glass sheet having one major surface in adhesive contact with a polymeric interlayer, the interlayer separating the glass sheets one from the other, the remaining major surface of each of the first and second glass sheets having a coating stack deposited thereon. These coating stacks each comprise an electrically conductive inorganic metal oxide layer having a refractive index >1.8 deposited directly on the surface of the first and second glass sheets, and an inorganic dielectric oxide layer having a refractive index <1.6 deposited on the inorganic metal oxide layer of each of the first and second glass sheets. These laminated glass units exhibit a visible light reflectance of <2%, and a center-of-glass U-value of <0.85.

In addition to the multi-layer coating stacks described, one or more color suppression layers may be utilized, such color suppression layers preferably being deposited on one or more of the major surfaces of the glass sheet prior to deposition of the electrically conductive inorganic metal oxide and inorganic dielectric oxide layers.

Other embodiments of the invention include coated multi-pane, insulated glass units. Each of the multi-pane units also, preferably, have color suppression layers deposited on one or more major surfaces of the multiple panes.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENT

This invention relates to one or more glass substrates having a pyrolytic anti-reflective coating on one or more surfaces thereof. More particularly, this invention relates to the utilization of one or more coating stacks that both reduce visible light reflection while also creating a glass article having a low U-value. Even more particularly, this invention is directed to thermally insulated glazing articles of varying configurations utilizing one or more iridescence suppressing layers and multilayered anti-reflective coating stacks which enhances the reduction in visible reflectance and the insulating properties of such glazing articles, while improving the color properties of the coated glass article.

It is known that a thin film stack utilizing an iridescense-suppressing layer combined with transparent thin film coatings is suitable for use on a glass substrate to form an anti-reflective article. The resulting coated article can exhibit an improved reduction in visible reflection while also improving the reflected color from the film side of the article.

It has, however, been found to be difficult to formulate a glazing unit with both low visible reflectance and low U-value. The present invention utilizes the surprising discovery that such results may be achieved by utilizing medium emissivity coatings, having properly chosen refractive indices and layer thicknesses on multiple surfaces, whereas such efforts have, in the past, focused on low emissivity coatings on a single surface.

Figure 1:
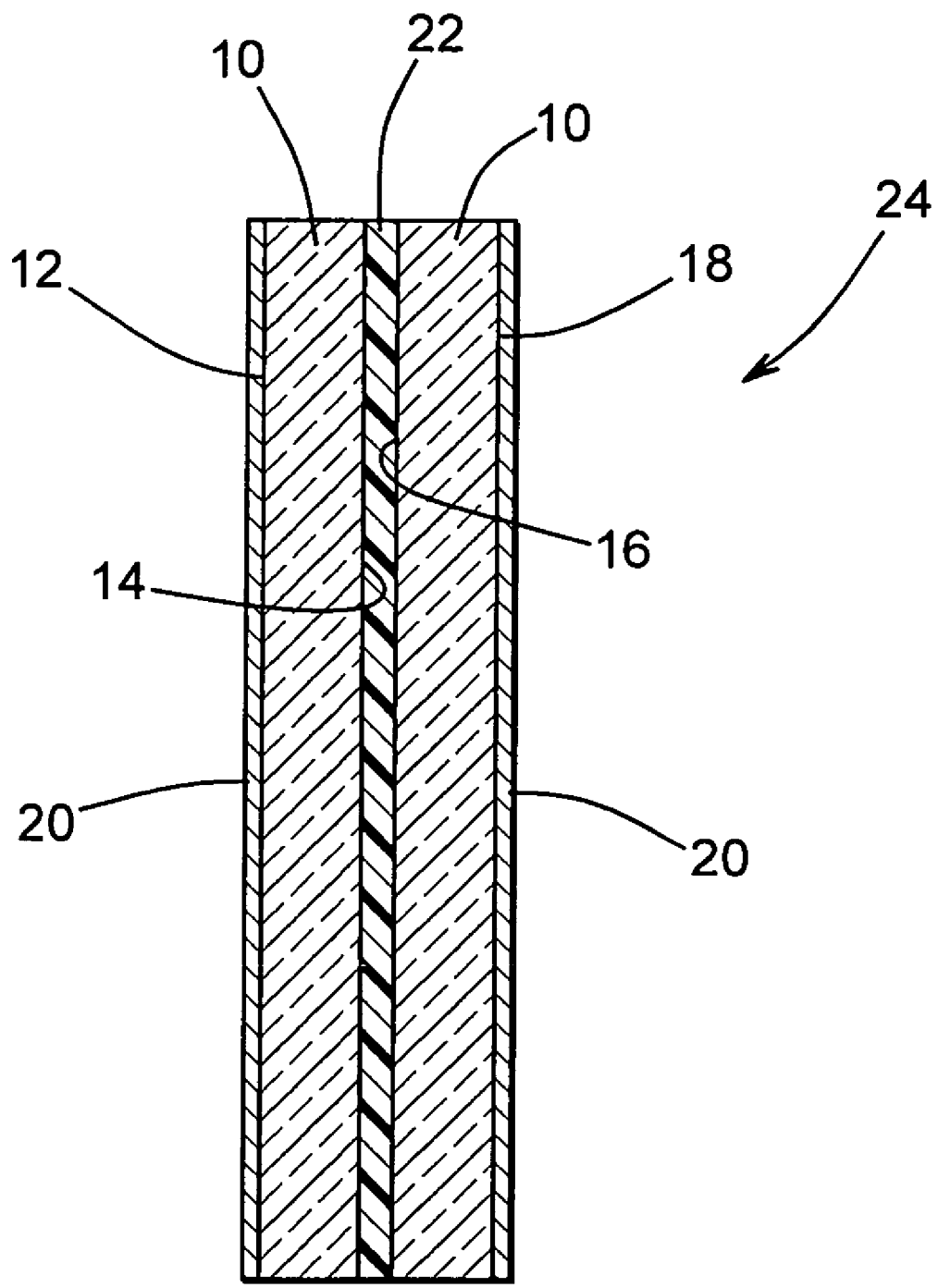
FIG. 1 is a sectional view of a laminated glass unit according to the present invention.
Figure 2:
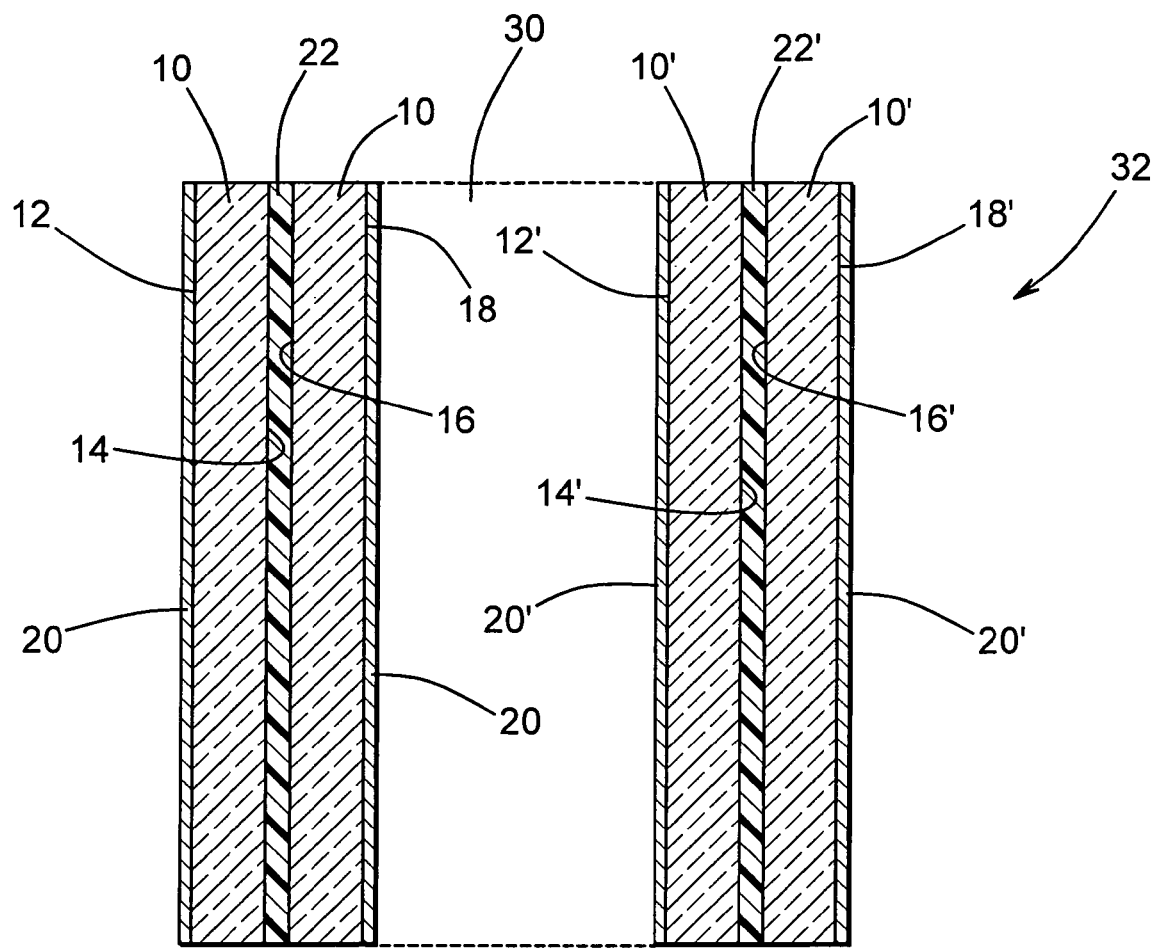
FIG. 2 is a sectional view of an insulated glass unit according to the present invention.

In preferred embodiments illustrated in FIGS. 1 and 2, multi-layer film stacks 20 are deposited on at least two major surfaces 12, 18 of a single glass laminate unit 24 or on two or more surfaces 12, 14, 16, 18, 12', 14', 16', 18' of an insulated glass unit 32 having two or more glass panes 10 in parallel, separated relation to each other, where two or more glass panes 10 are adhesively bonded to one another by a sheet (or sheets) 22, 22' of a suitable polymeric material.

The coated glass article of the present invention is especially suitable for applications requiring anti-reflective glass articles. For example, the coated glass article having an iridescence-suppressing layer (not shown) and an anti-reflective coating 20 may be applied to items such as glazings for commercial or residential buildings, or vehicle windows.

The glass substrates suitable 10 for use in preparing the coated glass article 24, 32 according to the present invention may include any of the conventional clear glass compositions known in the art. The preferred substrate is a clear float glass ribbon wherein the coating of the present invention, along with other optional coatings, is applied in the heated zone of the float glass process. However, other conventional processes for applying coatings on glass substrates are suitable for use with the present inventive coating. Additionally, other tinted glass substrates may be utilized as a substrate for the application of the coatings of the present invention. Tinted substrates may be selected to impart specific spectral properties in the coated article.

The iridescence-suppressing layer (not shown) of the present invention provides a means to reflect and refract light to interfere with the observance of iridescence. Iridescence-suppressing coatings are conventionally known within the art. For example, U.S. Pat. Nos. 4,187,336, 4,419,386, and 4,206,252, herein incorporated by reference, describe coating techniques suitable for suppressing interference colors. The layer of the present invention may comprise a single iridescence-suppressing coating a two-component coating or a gradient coating. The thicknesses of the layer of the iridescence-suppressing film stack are dependent upon the specific iridescence-suppressing film stack utilized.

The color of light transmitted and reflected from coated glass substrates 10 is measured according to the CIELAB color scale coordinates of a* and b*. A positive a* number indicates a red color hue and a negative value indicates a green color hue. A positive b* indicates yellow while a negative value indicates blue. A color saturation value, c*, is related to the observance of iridescence colors and is defined as the square root of the sum of the squares of a* and b*. A coated glass article having a saturation value or c* of less than 12 units is deemed not to exhibit iridescence.

With a single component layer, the suppression of iridescent colors may be accomplished by selecting a layer having a refractive index intermediate between the refractive indices of the glass substrate 10 and the coating deposited onto the layer. A layer thickness on the order of 300-700 Å has been found to be suitable with the single component layer of the present invention. Compounds suitable for use include inorganic metal oxides and silicon oxycarbide. Such suitable materials are those having a refractive index >1.6 and <1.8.

In a two-component layer, the coating deposited onto and adhering to the glass substrate has a high refractive index in the visible spectrum. A second coating, having a low refractive index, is deposited on, and adheres to the first coating of the layer. Each layer has a thickness selected such that the layer forms a total thickness of on the order of 200-800 Å.

The coatings suitable for use as high refractive index coatings include various metal oxides which have a refractive index >1.9. The preferred coating for use with the present invention is tin oxide. The low index coating of the layer may include silicon dioxide, magnesium fluoride, or silicon oxide doped with boron or phosphorus, with silicon dioxide being the preferred coating and having a refractive index <1.6.

The iridescence-suppressing layers are suitably applied onto the glass substrate through conventional thin film coating applications. For example, the layers may be applied onto a float glass substrate in the heated zone of a float glass process by, for example, known chemical vapor deposition techniques, other known pyrolytic techniques, sol-gel coating techniques or sputter coating techniques.

Apart from the iridescence-suppressing layer, the thin film stack 20 of the present invention comprises an electrically conductive inorganic metal oxide layer, and an inorganic dielectric oxide layer. Preferably, in the absence of an iridescence-suppressing layer, the electrically conductive inorganic metal oxide layer is typically deposited by a suitable method directly on a major surface of a glass pane 10 at a thickness $\geqq 800$ Å. The electrically conductive inorganic metal oxide layers, which are generally doped metal oxides, preferably comprise one chosen from the group consisting of: fluorine-doped tin oxide, aluminum-doped zinc oxide, boron-doped zinc oxide, gallium-doped zinc oxide, and indium tin oxide (ITO). The refractive index of the electrically conductive metal oxide is preferably >1.8.

Again, in a generally preferred configuration, an inorganic dielectric metal oxide layer is deposited by a suitable method on the electrically conductive layer at a thickness $\geqq 600$ Å. The inorganic dielectric oxide layer preferably comprises one chosen from the group consisting of an aluminum oxide, magnesium fluoride, a silicon oxycarbide, and silicon dioxide. The refractive index of the dielectric metal oxide layer is preferably <1.6.

The electrically conductive inorganic metal oxide films and inorganic dielectric oxide layers are preferably deposited by atmospheric chemical vapor deposition, but may also be deposited by other known methods such as sol-gel coating techniques or sputter coating techniques.

In a preferred configuration of the invention, first and second sheets of glass 10 are in a parallel relationship, a sheet 22 of a polymeric material being placed therebetween. Upon exposure to suitable conditions of temperature and pressure, the sheet 22 of polymeric material is adhesively bonded to a major surface of each sheet 14, 16, 14', 16' of glass, bonding the glass sheets one to the other. The sheet 22 of polymeric material is of such a type that when properly heated and pressed between the glass sheets, it is virtually transparent. Examples of such suitable sheet 22 of polymeric materials are polyvinyl butyral and polyvinyl chloride. Optionally, the polymeric interlayer may be coated or otherwise treated so as to exhibit solar control properties itself, apart from the coated glass substrate. Such interlayers were tested in Examples 3 and 4 shown in Table 1 herein.

In the laminated glass unit 24 of the present invention, the remaining major surface of each glass sheet 10 not bonded to the sheet 22 of polymeric material is coated by sequentially depositing thereon, by any suitable method, an electrically conductive metal oxide layer and an inorganic dielectric oxide layer, of the type, thickness and materials previously described herein. The electrically conductive metal oxide has a refractive index >1.8, and the dielectric metal oxide has a refractive index <1.6. The emissivity of each thin film stack is $\leqq 0.5$.

The visible light reflectance ($R_v$) of the laminated glass unit is <2%, with a center-of-glass U-value of <0.85. The visible light transmittance ($T_{vis}$) of the laminated glass unit of the present invention is >86% and the solar heat gain coefficient (SHG) is <0.78.

For purposes of this application, center-of-glass U-value can be defined as (Btu/hr/sq-ft/° F.) a measure of the heat gain or loss through a glazing due to environmental differences between the outdoor air and indoor air. Such U-values are calculated per NFRC 100 standard using LBLW 4.1. Solar Heat Gain (SHG) Coefficient can be defined as the ratio of the total solar heat gain through the glass relative to the incident solar radiation. The solar heat gain includes both the solar energy directly transmitted through the glass, plus the solar energy absorbed by the glass and subsequently convected and thermally radiated inward.

As will be appreciated, the addition of an iridescence-suppressing layer improves the neutrality of the color of reflected and transmitted light through the coated glass pane, thus making for a more aesthetically pleasing architectural glazing. Such a color-suppressing layer may also serve as a "barrier" layer to prevent migration of ions from the glass into, e.g., the electrically conductive metal oxide layer. Such migration of ions, such as sodium ions, can create undesirable "haze," which diminishes the visual clarity of the coated glass unit.

In another embodiment of the invention illustrated in FIG. 2, two or more laminated glass units 24 are coated as will hereinafter be described in greater detail, the coated laminated glass units 24 being in a parallel, spaced-apart relationship, with a frame (not shown) around the periphery of the laminated units. A spacer component (not shown) may also be placed between the laminated units in a peripheral area, generally coinciding with the peripheral frame. Typically, the space 30 between the laminated glass units 24 is left as an air space, or may be evacuated, and filled with an inert gas, for example, argon.

In this embodiment, an electrically conductive metal oxide layer and an inorganic dielectric oxide layer are sequentially deposited by a suitable method on each of the unbonded major surfaces 12, 18, 12', 18' of at least two laminated glass units 24. The thicknesses of the conductive metal oxide layers and inorganic dielectric oxide layers are each in the range of thicknesses previously described herein, and are each chosen from the materials previously described, and thus, have refractive indices of >1.8 for each of the electrically conductive metal oxide layers, and <1.6 for each of the inorganic dielectric oxide layers.

Each coated surface of the insulated glass unit of the invention has an emissivity ≦0.5, preferably within the range of 0.4 to 0.5. Other properties of the insulated glass unit 32 of the present invention are a visible light reflectance ($R_v$) of <4% and a center-of-glass U-value of <0.35. Additionally, the visible light transmittance of the insulated glass unit 32 of the invention is >75%, while the solar heat gain of the insulated glass unit is <0.68.

Optionally, prior to the deposition of the just-described electrically conductive metal oxide and inorganic dielectric oxide layers, a color-suppression layer of the types previously described herein may be deposited directly on one or more of the surfaces of one or more of the laminated glass units 24 of the insulated glass unit 32, by a suitable method. The effects of such color-suppression layers on film stack performance have been previously described herein.

In a particularly preferred embodiment, film stacks comprising a color suppression layer, an electrically conductive metal oxide, and an inorganic dielectric oxide layer are deposited on each unbonded major surface 12, 18, 12' 18' of two laminated glass units 24.

The following examples, which constitute the best mode presently contemplated by the inventors for practicing the present invention, are presented solely for the purpose of further illustrating and disclosing the present invention, and are not to be construed as a limitation on the invention.

The examples are discussed with reference to the information provided in Tables 1 and 2, herein.

Example 1 and Comparative Example 1

A laminated glass unit was formed from two 3.2 mm thick sheets of standard soda-lime-silica flat glass manufactured by the float process. One major surface of each of the glass sheets had been coated by atmospheric chemical vapor deposition with an anti-reflective film stack comprising $SnO_2$(150 Å)/$SiO_2$(300 Å)/$SnO_2$:F(1300 Å)/$SiO_2$ (850 Å) on the glass substrate during the float glass manufacturing process. Subsequent to cooling of the coated glass to room temperature, a sheet of 0.76 mm thick polyvinyl butyral is placed between the two coated glass sheets, being in contact with the uncoated major surfaces of each glass sheet (see Table 1). Thus, the noted anti-reflective film stacks were applied to surfaces 1 and 4, using the conventional nomenclature numbering the outer surface of the outer sheet (12) as surface 1, the inner surface of the outer sheet (14) as surface 2, the inner surface of the inner sheet (16) as surface 3, and the outer surface of the inner sheet (18) as surface 4. Each of the noted anti-reflective film stacks provided an emissivity of 0.48.

As described previously, the glass sheets separated by the plastic interlayer material were subjected to sufficient temperature and pressure to cause the plastic interlayer to adhesively bond to each glass sheet, and the glass sheets to be bonded one to the other, thus forming a laminated glass unit. When so treated, the plastic interlayer becomes essentially transparent, so the laminated glass unit was suitable for varying architectural applications.

As can be seen from Table 1, the laminated glass unit designated Example 1 had a very low visible light reflectance (1.5-1.8%), while at the same time having a center-of-glass U-value of 0.82.

The properties of Example 1, when compared with a single sheet (monolithic) of clear float glass of 3.2 mm in thickness, as Comparative Example 1 (C1), are clearly superior, as visible light reflectance of the clear monolithic glass is about 8%, with a center-of-glass U-value of 1.02 (see Table 1).

Example 2 and Comparative Example 2

Example 2 comprised a laminate structure as in Example 1, except that the coating layer thicknesses are as follows: $SnO_2$ (~250 Å)/$SiO_2$(~250 Å)/$SnO_2$:F(2200 Å)/$SiO_2$(850 Å), and in particular the electrically conductive metal oxide layer ($SnO_2$:F) was significantly greater (2200 Å v 1300 Å). The emissivity provided by the film stacks of Example 2 is 0.22. As can be seen from Table 1, the laminated structure of Example 2 still provides a visible light reflectance <2%, while exhibiting an even better center-of-glass U-value of 0.66.

When compared to a low-emissivity coated single sheet of 6 mm clear glass, Energy Advantage glass having a film stack of $SnO_2$(250 Å)/$SiO_2$(250 Å)/$SnO_2$:F(3400 Å) and emissivity of 0.15 and designated Comparative Example 2 (C2), the difference in visible light reflectance was very significant (<2% v 10%), although the U-value of the low-E coated glass was slightly better than the U-value for Example 2 (0.64 v 0.66) (see Table 1).

Examples 3 and 4

Examples 3 and 4 are each laminate structures as in Example 1, except that the two different solar control interlayers were utilized in place of the standard PVB interlayer. These solar control interlayers block much of the radiation in the range of 1,500 to 2,100 nm and are commercially available from Sekisui Chemical Co., Ltd. In the laminate of example 3, the interlayer was the Sekisui SCF-01, while for example 4 the interlayer was the Sekisui SCF-06. The resulting properties are shown in Table 1.

TABLE 1

| | Single Glazed Unit | | | | | | | | |
|---|---|---|---|---|---|---|---|---|---|
| | | Visible Light | | | Total Solar Energy | | | U-value | |
| Examples | Tvis % | R (outside) % | R (inside) % | Tsol % | Rsol % | Tuv % | Tdw ISO | (US winter) | SHGC |
| 1 | 91% | 1.5-1.8% | 1.5-1.8% | 70% | 3% | 0% | 60% | 0.82 | .077 |
| 2 | 87% | <2 | <2 | 62% | 4% | 4% | 62% | 0.66 | 0.69 |
| 3 | 91% | <2 | <2 | 62% | 3% | 0% | 57% | 0.83 | 0.71 |
| 4 | 87% | <2 | <2 | 53% | 3% | 0% | 52% | 0.83 | 0.64 |
| C1 | 88% | 8% | 8% | 77% | 7% | 62% | 65% | 1.02 | 0.81 |
| C2 | 82% | 10% | 11% | 66% | 10% | 49% | 56% | 0.64 | 0.70 |

Example 5 and Comparative Example 3

Example 5 was an insulated glass unit comprising two laminated glass units, each laminate being as described in Example 1, in a spaced apart, parallel relationship and having a frame around the periphery thereof. The space between the two laminated glass units contained ambient air. As can be seen from Table 2, the insulated glass unit of Example 5 exhibited a visible light reflectance of 3.6% and an excellent center-of-glass U-value of 0.34.

By contrast, an insulated glass unit made with two sheets of 6 mm thick clear glass and ambient air in the intervening air space, designated Comparative Example 3 (C3), exhibits a much higher visible light reflectance of 14% and a higher center-of-glass U-value at 0.47.

Example 6 and Comparative Example 4

Example 6 was an insulated glass unit utilizing two coated laminated units as in Example 2, with the space between the two laminated units containing ambient air and having a frame around the periphery thereof. This structure exhibited a very low visible light reflectance of 1.7%, and an outstanding center-of-glass U-value of 0.26 (see Table 2).

This may be compared to an insulated glass unit having a pane of 6 mm clear glass, with a second 6 mm pane of a low-emissivity coating on the major surface facing the air space between the two panes of glass, designated Comparative Example 4 (C4). The space between the two glass panes contained ambient air. This structure exhibited a high visible light reflectance of between 16 and 17% and a slightly higher center-of-glass U-value (0.33 v 0.26) (see Table 4).

Overall, the laminated glass units and the insulated glass units utilizing the coated glass of the present invention exhibited lower visible light reflectance and superior thermal insulating properties when compared with conventional structures, and showed the hard-to-obtain balance between visible light reflectance, and thermal insulating properties.

Examples 7-11 and Comparative Example 5

Examples of other structures evaluated by the inventors can also be seen in Table 2. Example 7 was an insulated glass unit utilizing two coated laminated units as in Example 2, with the space between the two laminated units containing argon and having a frame around the periphery thereof.

Example 8 was an insulated glass unit utilizing two coated laminated units as in Example 3, with the space between the two laminated units containing ambient air and having a frame around the periphery thereof.

Example 9 was an insulated glass unit utilizing two coated laminated units as in Example 4, with the space between the two laminated units containing ambient air and having a frame around the periphery thereof.

Example 10 was an insulated glass unit utilizing one coated laminate as in Example 2 and a clear glass sheet, with the space between the two laminated units containing ambient air and having a frame around the periphery thereof.

Example 11 was an insulated glass unit utilizing one coated laminate as in Example 1 and a clear glass sheet, with the space between the two laminated units containing ambient air and having a frame around the periphery thereof.

Comparative Example 4 (C4) was an insulated glass unit utilizing one Energy Advantage low-e coated glass sheet (6 mm) and a 6 mm clear glass sheet, with the space between the two laminated units containing ambient air and having a frame around the periphery thereof.

Comparative Example 5 (C5) was an insulated glass unit utilizing one coated laminated in Example 1 and one Energy Advantage low-e coated glass sheet (6 mm), with the space between the two laminated units containing ambient air and having a frame around the periphery thereof.

TABLE 2

| | Double Glazed Unit | | | | | | | | |
|---|---|---|---|---|---|---|---|---|---|
| Ex. | Tvis % | R (outside) % | R (inside) % | Tsol % | Rsol % | Tuv % | Tdw ISO | U-value (U.S. winter) | SHGC |
| 5 | 84% | 3.6% | 3.6% | 54% | 5% | 0% | 52% | 0.34 | 0.67 |
| 6 | 76% | 1.7% | 1.7% | 44% | 6% | 1% | 50% | 0.26 | 0.58 |
| 7 | 76% | 1.7% | 1.7% | 44% | 6% | 1% | 50% | 0.22 | 0.58 |
| 8 | 82% | 2.0% | 2.0% | 47% | 5% | 0% | 49% | 0.34 | 0.60 |
| 9 | 75% | 2.1% | 2.1% | 38% | 4% | 0% | 42% | 0.34 | 0.52 |
| 10 | 77% | 7.2% | 8.9% | 50% | 8% | 4% | 55% | 0.34 | 0.60 |
| 11 | 81% | 9% | 10% | 55% | 7% | 0% | 53% | 0.41 | 0.66 |
| C3 | 78% | 14% | 14% | 60% | 12% | 46% | n/a | 0.47 | 0.70 |

TABLE 2-continued

Double Glazed Unit

| Ex. | Tvis % | R (outside) % | R (inside) % | Tsol % | Rsol % | Tuv % | Tdw ISO | U-value (U.S. winter) | SHGC |
|---|---|---|---|---|---|---|---|---|---|
| C4 | 73% | 17% | 16% | 52% | 14% | 36% | n/a | 0.33 | 0.66 |
| C5 | 75% | 11% | 12% | 50% | 9% | 0% | 48% | 0.32 | 0.63 |

In accordance with the provisions of the patent statutes, the present invention has been described in what is considered to represent its preferred embodiment. It should be noted, however, that the invention can be practiced otherwise than as specifically illustrated and described without departing from its spirit and scope.

What is claimed is:

1. An insulated glass unit comprising:
    at least first and second laminated glass units, the at least first and second laminated glass units being parallel to and separated from each other, and each having a first and a second major surface;
    a first coating stack deposited on the first major surface of the first laminated glass unit comprising an electrically conductive inorganic metal oxide layer and an inorganic dielectric oxide layer;
    a second coating stack deposited on the second major surface of the first laminated glass unit comprising an electrically conductive inorganic metal oxide layer and an inorganic dielectric oxide layer;
    a third coating stack deposited on the first major surface of the second laminated glass unit comprising an electrically conductive inorganic metal oxide layer and an inorganic dielectric oxide layer; and
    a fourth coating stack deposited on the second major surface of the second laminated glass unit comprising an electrically conductive inorganic metal oxide layer and an inorganic dielectric oxide layer;
    wherein each of the electrically conductive metal oxide layers of the first through fourth coating stacks have a refractive index >1.8, and each of the inorganic dielectric oxide layers of the first through fourth coating stacks have a refractive index <1.6;
    the first, second, third, and fourth coating stacks each having an emissivity $\geq 0.4$ and $\leq 0.5$, and the insulated glass unit exhibiting a visible light reflectance of <4% and a center-of-glass U value of <0.35.

2. The insulated glass unit of claim 1, wherein the first and second laminated glass units comprise at least first and second sheets of glass, each of the first and second glass sheets having first and second major surfaces; with each glass sheet having one major surface in adhesively bonding contact with a polymeric interlayer, the interlayer separating the glass sheets one from the other.

3. The insulated glass unit defined in claim 1, wherein prior to depositing the first through fourth coating stacks, an iridescence-suppressing layer is deposited directly on one or more of the first and second major surfaces of each of the first and second laminated glass units.

4. The insulated glass unit defined in claim 3, wherein the iridescence-suppressing layer comprises an inorganic metal oxide or silicon oxycarbide layer having a refractive index >1.6 and <1.8.

5. The insulated glass unit defined in claim 3, wherein the iridescence-suppressing layer comprises an inorganic metal oxide layer having a refractive index >1.9, and a silica layer deposited on the inorganic metal oxide layer having a refractive index <1.6.

6. The insulated glass unit defined in claim 1, wherein the thickness of each of the electrically conductive inorganic metal oxide layers is $\geq 800$ Å.

7. The insulated glass unit defined in claim 1, wherein the thickness of each of the inorganic dielectric oxide layers is $\geq 600$ Å.

8. The insulated glass unit defined in claim 4, wherein the iridescence-suppressing layer has a thickness of 300-700 Å.

9. The insulated glass unit defined in claim 5, wherein the iridescence-suppressing layer has a total thickness of 200-800 Å.

10. The insulated glass unit defined in claim 1, wherein the visible light transmittance of the unit is >75%.

11. The insulated glass unit defined in claim 1, wherein the solar heat gain coefficient of the unit is <0.68.

12. The insulated glass unit defined in claim 1, wherein the electrically conductive inorganic metal oxide layer is a doped metal oxide.

13. The insulated glass unit defined in claim 1, wherein the electrically conductive inorganic metal oxide layers comprise at least one chosen from the group consisting of: fluorine-doped tin oxide, indium tin oxide, aluminum-doped zinc oxide, boron-doped zinc oxide, and gallium-doped zinc oxide.

14. The insulated glass unit defined in claim 1, wherein the inorganic dielectric oxide layers comprise one chosen from the group consisting of MgF and $SiO_2$.

* * * * *